(12) United States Patent
Ohbayashi et al.

(10) Patent No.: US 9,981,639 B2
(45) Date of Patent: May 29, 2018

(54) BRAKE CONTROL APPARATUS FOR VEHICLE

(71) Applicant: TOYOTA JIDOSHA KABUSHIKI KAISHA, Toyota-shi, Aichi (JP)

(72) Inventors: Motonari Ohbayashi, Nagakute (JP); Akihiro Kida, Toyota (JP); Toshihiro Takagi, Nissin (JP); Masashi Yamazaki, Toyota (JP); Tatsuya Nishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/433,280

(22) Filed: Feb. 15, 2017

(65) Prior Publication Data

US 2017/0320473 A1 Nov. 9, 2017

(30) Foreign Application Priority Data

May 6, 2016 (JP) .................. 2016-092958

(51) Int. Cl.
| | |
|---|---|
| *B60T 7/22* | (2006.01) |
| *B60T 8/171* | (2006.01) |
| *B60T 8/172* | (2006.01) |
| *B60R 21/0134* | (2006.01) |
| *G08G 1/16* | (2006.01) |
| *B60W 30/09* | (2012.01) |

(52) U.S. Cl.
CPC ............ *B60T 7/22* (2013.01); *B60R 21/0134* (2013.01); *B60T 8/171* (2013.01); *B60T 8/172* (2013.01); *B60W 30/09* (2013.01); *G08G 1/16* (2013.01); *G08G 1/166* (2013.01); *B60T 2201/022* (2013.01); *B60T 2210/32* (2013.01); *B60T 2220/04* (2013.01); *B60T 2270/89* (2013.01)

(58) Field of Classification Search
CPC . B60T 7/22; B60T 8/171; B60T 8/172; B60T 2201/022; B60T 2210/32; B60T 2220/04; B60T 2270/89; G08G 1/16; G08G 1/166; B60R 21/0134; B60W 30/09
See application file for complete search history.

(56) References Cited

U.S. PATENT DOCUMENTS

| | | | | |
|---|---|---|---|---|
| 8,576,055 | B2 * | 11/2013 | Hara ...................... | G08G 1/166 340/435 |
| 8,655,579 | B2 * | 2/2014 | Sakugawa .............. | G08G 1/166 340/435 |
| 2007/0288133 | A1 * | 12/2007 | Nishira ................ | G05D 1/0214 701/23 |

(Continued)

FOREIGN PATENT DOCUMENTS

JP  2011-065338 A  3/2011

*Primary Examiner* — Thomas G Black
*Assistant Examiner* — Sze-Hon Kong
(74) *Attorney, Agent, or Firm* — Oliff PLC

(57) ABSTRACT

A vehicle brake control apparatus according to the invention stops an activation of a brake device when a person exists outside of a braking area. The apparatus determines whether or not the person exists outside of the braking area on the basis of a moving direction and a moving amount of at least one characteristic point included in a landscape image captured by a camera device when a person image included in the landscape image cannot be detected by a pattern matching technique.

5 Claims, 13 Drawing Sheets

(56) References Cited

U.S. PATENT DOCUMENTS

| | | | |
|---|---|---|---|
| 2009/0143987 A1* | 6/2009 | Bect | B60R 21/0134 701/301 |
| 2009/0187321 A1* | 7/2009 | Otsuka | B60R 21/0134 701/70 |
| 2012/0035846 A1* | 2/2012 | Sakamoto | B60T 8/17558 701/301 |
| 2012/0300078 A1* | 11/2012 | Ogata | G08G 1/166 348/148 |
| 2014/0333467 A1* | 11/2014 | Inomata | G01S 13/867 342/27 |
| 2015/0166062 A1* | 6/2015 | Johnson | B60W 30/12 701/41 |
| 2015/0258992 A1* | 9/2015 | Sawamoto | B60W 30/17 701/1 |
| 2015/0274165 A1* | 10/2015 | von Collani | B60W 30/143 701/70 |
| 2015/0346337 A1* | 12/2015 | Jung | G01S 13/867 342/55 |
| 2016/0272172 A1* | 9/2016 | Lee | B60T 7/22 |
| 2016/0355181 A1* | 12/2016 | Morales Teraoka | B60W 30/14 |
| 2017/0008521 A1* | 1/2017 | Braunstein | G01C 21/32 |
| 2017/0039855 A1* | 2/2017 | Maeda | B60K 31/0008 |
| 2017/0057497 A1* | 3/2017 | Laur | B60W 30/09 |
| 2017/0139418 A1* | 5/2017 | Hiramatsu | G05D 1/0214 |
| 2017/0140229 A1* | 5/2017 | Ogata | G06K 9/00805 |
| 2017/0217394 A1* | 8/2017 | Shima | B60R 21/0134 |
| 2017/0232964 A1* | 8/2017 | Moritani | B60Q 9/008 701/70 |

\* cited by examiner

BRAKE CONTROL APPARATUS FOR VEHICLE

BACKGROUND OF THE INVENTION

Field of the Invention

The present invention relates to a brake control apparatus for activating a brake device to brake a vehicle in order to prevent the vehicle from colliding against a person.

Description of the Related Art

There are known a brake control apparatus which activates a brake device to brake a vehicle when a person exists near the vehicle (hereinafter, this apparatus will be referred to as "the conventional apparatus". This conventional apparatus acquires an image of a landscape in a traveling direction of the vehicle by a camera mounted on the vehicle (hereinafter, the image of the landscape will be referred to as "the landscape image". The conventional apparatus determines whether or not an image of a person (hereinafter, the image of the person will be referred to as "the person image") is included in the acquired landscape image. In other words, the conventional apparatus performs a process for detecting the person image from the landscape image by using a pattern matching technique (as to the pattern matching technique, see JP 2011-65338 A). When the conventional apparatus detects the person image, the conventional apparatus determines whether or not a person exists near the vehicle by using the detected person image.

When the conventional apparatus determines that a person exists near the vehicle, the conventional apparatus starts an activation of the brake device to brake the vehicle. Thereby, the vehicle is prevented from colliding against the person.

Further, when the conventional apparatus determines that no person exists near the vehicle after starting the activation of the brake device, the conventional apparatus stops the activation of the brake device.

In the pattern matching technique, various person images expected to be included in the landscape image have been prepared as image patterns, i.e., templates, respectively. According to the pattern matching technique, the landscape image is compared with the templates. When an image having a high degree of a conformity to any of the templates is included in the landscape image, the image is detected as the person image.

Even when a person image is included in the landscape image, the conventional apparatus may not detect the person image by the pattern matching technique if no template corresponding to the person image is prepared. For example, when a person is extremely near the vehicle, only an image of a part of a body of the person is included in the landscape image. In this regard, when no template corresponding to the image of the part of the body of the person is prepared, the conventional apparatus cannot detect the person image by the pattern matching technique.

As described above, the conventional apparatus is configured to detect the person image by the pattern matching technique. Thus, after the activation of the brake device is started, a situation that the person image cannot be detected (hereinafter, this situation will be referred to as "the non-detection situation") may occur. In this case, the conventional apparatus cannot whether or not the person exists near the vehicle and thus, cannot determine a timing for stopping the activation of the brake apparatus. Therefore, a continuation time of braking the vehicle may increase.

SUMMARY OF THE INVENTION

The present invention has been made for solving the aforementioned problems. An object of the present invention is to provide a vehicle brake control apparatus for activating a brake device to brake a vehicle when a person exists near the vehicle, the vehicle brake control apparatus being capable of determining whether or not no person exists near the vehicle, thereby to stop an activation of the brake device at a suitable timing even when a situation that the person image cannot be detected in a landscape image by a pattern matching technique, occurs after starting the activation of the brake device.

The vehicle brake control apparatus according to the present invention (hereinafter, this vehicle brake control apparatus will be referred to as "the invention apparatus") is applied to a vehicle (V) including:
  a brake device (32) for braking the vehicle (V); and
  image capture means (11) for capturing an image of a landscape in a traveling direction of the vehicle (V) as a landscape image (Limg).

The invention apparatus comprises control means (10, 30) configured:
  to perform a process for detecting a person image (Himg) included in the landscape image (Limg) by a pattern matching technique (see a process of a step 712 of each of FIGS. 7 and 11), the person image (Himg) being an image of a person (H);
  to determine whether or not a person (H) exists in a braking area (Abrk) on the basis of a position (Pimg) of the person image (Himg) in the landscape image (Limg) (see a process of a step 725) when the control means (10, 30) detects the person image (Himg) included in the landscape image (Limg) (see a determination "Yes" at a step 715), the braking area (Abrk) being a part of a traveling scheduled area (Av) of the vehicle (V) which the vehicle (V) may collide against the person (H) when the person (H) exists in the braking area (Abrk);
  to start an activation of the brake device (32) to brake the vehicle (V) (see a process of a step 730) when the control means (10, 30) determines that the person (H) exists in the braking area (Abrk) (a determination "Yes" at the step 725);
  to determine whether or not the person (H) exists outside of the braking area (Abrk) on the basis of the position (Pimg) of the person image (Himg) in the landscape image (Limg) after the control means (10, 30) starts the activation of the brake device (32) (see the process of the step 725); and
  to stop the activation of the brake device (32) (see a process of a step 735) when the control means (10, 30) determines that the person (H) exists outside of the braking area (Abrk) (see a determination "No" at the step 725).

According to the invention apparatus, when it is determined that the person exists in the braking area, the brake device is automatically activated. Therefore, when the person exists in the braking area and the vehicle travels toward the person, the vehicle is stopped. On the other hand, when the person exists in the braking area and the vehicle is stopped, the vehicle is maintained at a stopped state even when a driver of the vehicle tries to travel the vehicle. Thus, the vehicle is prevented from colliding against the person.

In addition, the control means (10, 30) is configured:
to determine whether or not a non-detection situation occurs after the control means (10, 30) starts the activation of the brake device (32) (see the step 715 of each of FIGS. 7 and 11), the non-detection situation being a situation that the control means (10, 30) cannot detect the person image (Himg) by the pattern matching technique;
to acquire at least one first characteristic point (Fn, Fp) included in a first landscape image (Limg11, Limg21) and at least one second characteristic point (Fn, Fp) included in a second landscape image (Limg12, Limg22) when the non-detection situation occurs before the control means (10, 30) determines that the person (H) exists outside of the braking area (Abrk) (see a determination "No" at the step 715 of each of FIGS. 7 and 11 and a determination "Yes" at a step 740 of each of FIGS. 7 and 11), the first landscape image (Limg11, Limg21) being the landscape image (Limg) acquired at a first time (t11), the second landscape image (Limg12, Limg22) being the landscape image (Limg) acquired at a second time (t12) before the first time (t11), the at least one second characteristic point (Fn, Fp) corresponding to the at least one first characteristic point (Fn, Fp);
to acquire a moving direction (Dh) and a moving amount (Dm) of the at least one characteristic point (Fn, Fp) on the basis of the at least one first characteristic point (Fn, Fp) and the at least one second characteristic point (Fn, Fp) (see a process of a step 805 of FIG. 8 and a process of a step 1210 of FIG. 12); and
to stop the activation of the brake device (32) (see processes of steps 825 and 1225) when the control means (10, 30) determines that the person (H) exists outside of the braking area (Abrk) on the basis of the moving direction (Dh) and the moving amount (Dm) (see a determination "Yes" at a step 820 and a determination "Yes" at a step 1220).

With this configuration of the present invention, when the person image cannot be detected by the pattern matching technique, that is, when the non-detection situation occurs, it can be determined whether or not the person may exist outside of the braking area on the basis of the moving direction and the moving amount. Therefore, a timing for stopping the activation of the braking device can be determined. Thus, a continuation time of activating the brake device can be prevented from increasing excessively.

According to an aspect of the present invention, the first landscape image (Limg11, Limg21) may be the landscape (Limg11) acquired after the non-detection situation occurs. In particular, the first and second landscape images (Limg11, Limg 12, Limg21, Limg22) may be landscape images (Limg11, Limg12) acquired after the non-detection situation occurs, respectively. Further, the at least one first characteristic point (Fn, Fp) may comprise a plurality of the first characteristic points (Fn) and the at least one second characteristic point (Fn, Fp) may comprise a plurality of the second characteristic points (Fn) corresponding to the first characteristic points (Fn), respectively.

In this case, the control means (10, 30) may be configured:
to acquire primary motion vectors (VTn) which are motion vectors each representing the moving direction (Dh) and the moving amount (Dm) of the corresponding first characteristic point (Fn) on the basis of the first characteristic points (Fn) and the second characteristic points (Fn);
to select secondary motion vectors (VTm) which are the first motion vectors (VTn) regarding a moving object from the primary motion vectors (VTn) on the basis of a similarity between the first motion vectors (VTn); and
to determine whether or not the person (H) exists outside of the braking area (Abrk) on the basis of at least one of the secondary motion vectors (VTm) (see a process of a step 820 of FIG. 8).

With the configuration of this aspect, at least one of the landscape images acquired after the non-detection situation occurs, is used for determining whether or not the person exists outside of the braking area. In this case, compared with a case that only the landscape image or images before the non-detection situation occurs is/are used, the landscape image acquired at a time closer to the present time is used. Thus, it can be accurately determined whether or not the person exists outside of the braking area. Therefore, the continuation time of activating the brake device can be prevented from increasing excessively.

According to a further aspect of the present invention, the second landscape image (Limg12, Limg22) may be the landscape image (Limg22) acquired before the non-detection situation occurs.

In this case, the control means (10, 30) may be configured:
to acquire a predetermined time (Treq) on the basis of the moving direction (Dh), the moving amount (Dm) and a position (Pb) of the person image (Himg22) in the second landscape image (Limg22), the predetermined time (Treq) being a time estimated to be required for the person (H) to move out from the braking area (Abrk) after the non-detection situation occurs; and
to determine that the person (H) exists outside of the braking area (Abrk) when a time elapsing from an occurrence of the non-detection situation becomes equal to or larger than a threshold time (T2th) which is equal to or larger than the predetermined time (Treq) (see a determination "Yes" at a step 1220), the threshold time (T2th) increasing as the predetermined time (Treq) increases.

According to a further aspect of the present invention, the first and second landscape images (Limg11, Limg12, Limg21, Limg22) may be landscape images (Limg21, Limg22) acquired before the non-detection situation occurs, respectively.

The control means (10, 30) may be configured:
to acquire a predetermined time (Treq) on the basis of the moving direction (Dh), the moving amount (Dm) and a position (Pb) of the person image (Himg21) in the first landscape image (Limg21), the predetermined time (Treq) being a time estimated to be required for the person (H) to move out from the braking area (Abrk) after the non-detection situation occurs; and
to determine that the person (H) exists outside of the braking area (Abrk) when a time elapsing from an occurrence of the non-detection situation becomes equal to or larger than a threshold time (T2th) which is equal to or larger than the predetermined time (Treq), the threshold time (T2th) increasing as the predetermined time (Treq) increases.

With the configuration of these aspect, a time expected to be required for the person to move out from the braking area after the non-detection situation occurs is obtained on the basis of the moving direction of the person, the moving amount of the person and the position of the person. In addition, when the obtained time elapses, it is determined that the person moves out from the braking area. Therefore, the continuation time of activating the brake device can be prevented from increasing excessively.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Figure 1:
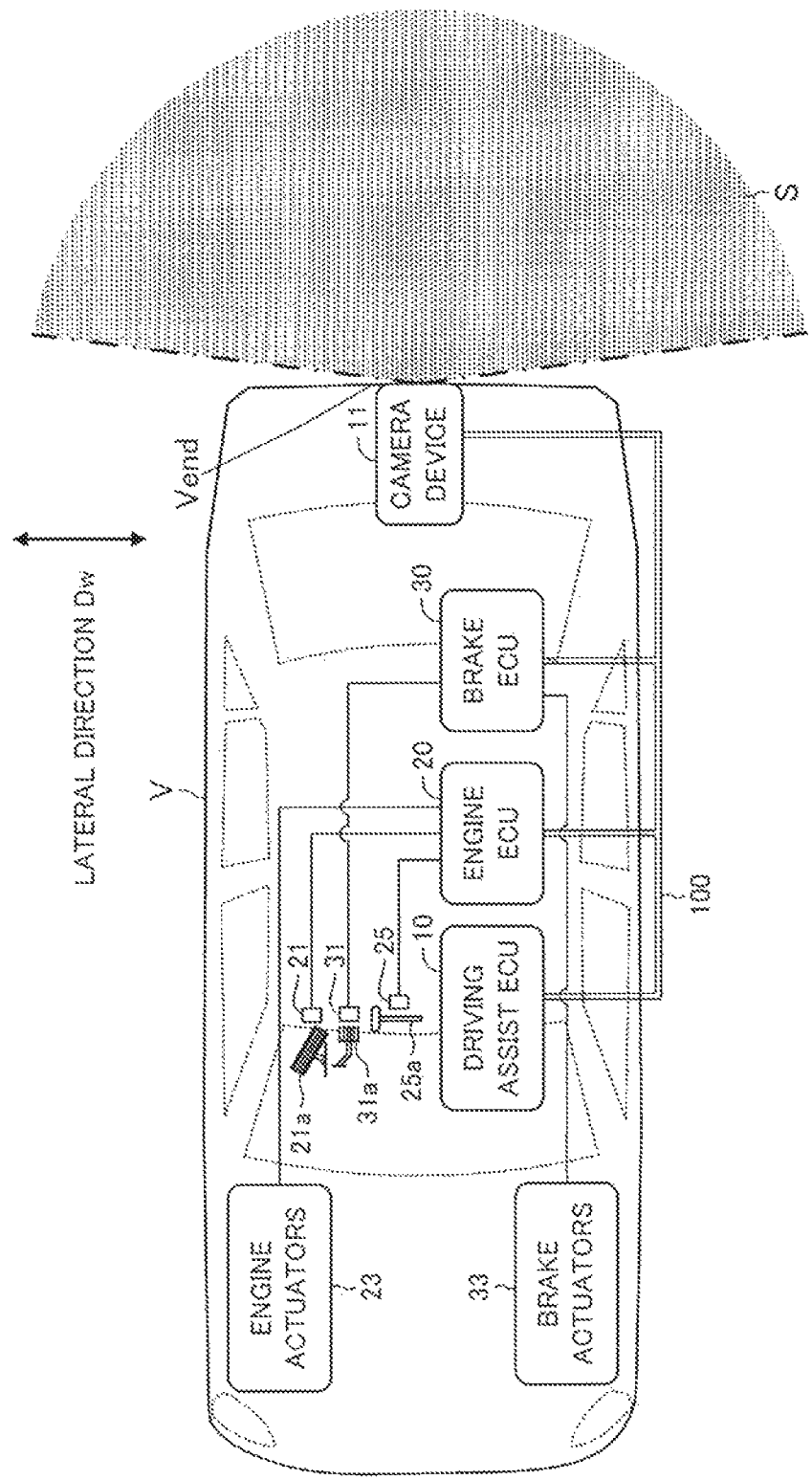
FIG. 1 is a view for showing a configuration of a vehicle, to which a brake control apparatus according to an embodiment of the present invention is applied.
Figure 2:
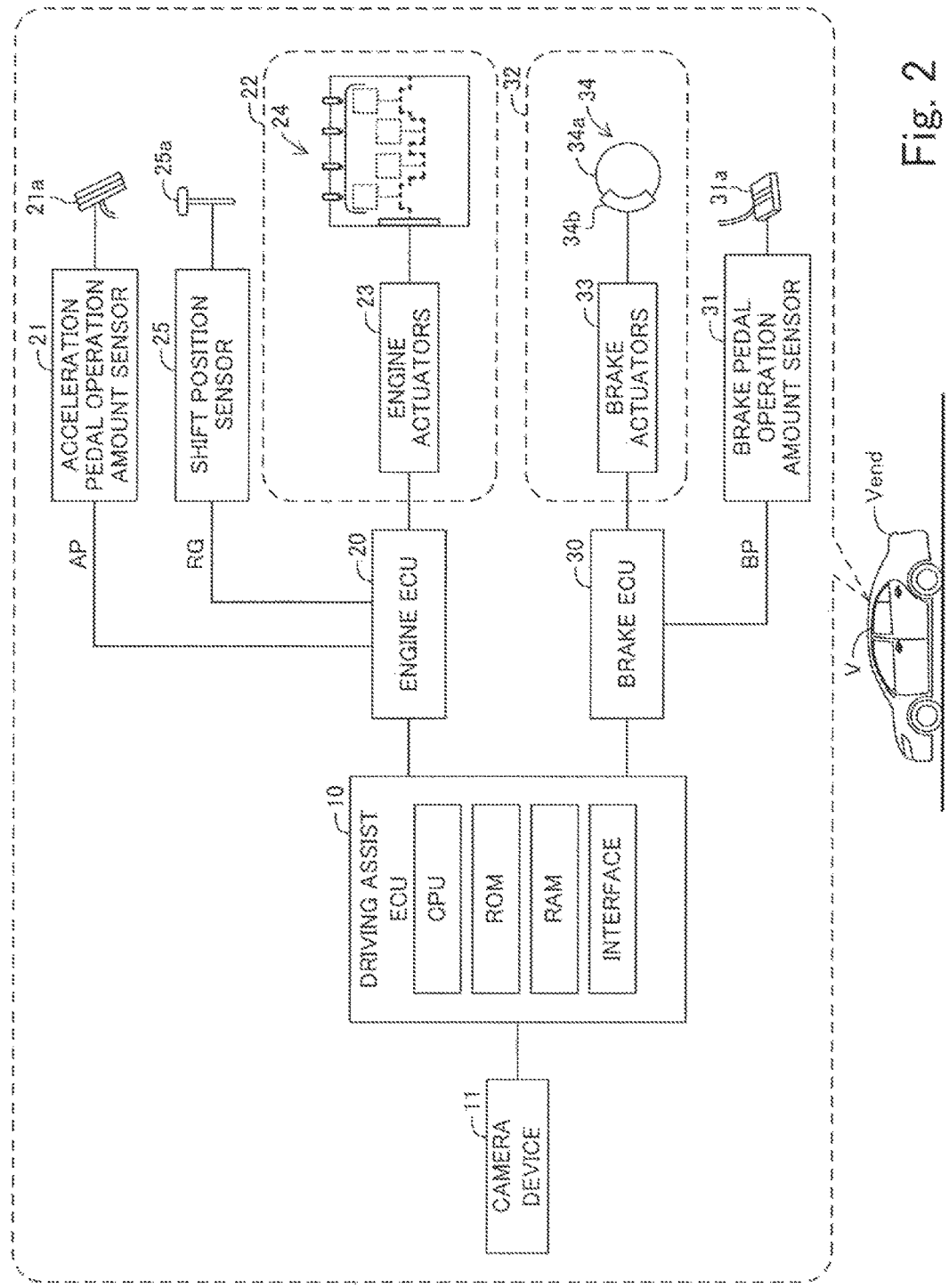
FIG. 2 is a view for showing a configuration of the brake control apparatus and the like according to the embodiment of the present invention.

Below, a brake control apparatus according to embodiments of the present invention will be described with reference to the drawings. As shown in FIGS. 1 and 2, the brake control apparatus according to a first embodiment of the present invention is applied to a vehicle V and includes a driving assist ECU 10, an engine ECU 20 and a brake ECU 30.

The ECUs 10, 20 and 30 can send to and receive from each other or communicate with each other via a communication/sensor system CAN (i.e., a communication/sensor system Controller Area Network) 100. The ECU means an electronic control unit. Each of the ECUs 10, 20 and 30 is an electronic control circuit including a microcomputer as a main component part including a CPU, a ROM, a RAM, an interface and the like. The CPU realizes various functions described later by executing instructions or routines stored in a memory (i.e., the ROM). The ECUs 10, 20 and 30 may be integrated into one ECU.

The driving assist ECU 10 is electrically connected in communication with a camera device 11 via the CAN 100. The camera device 11 is provided at a central portion of a rearward end Vend of the vehicle V in a lateral direction Dw. The camera device 11 includes a CCD camera (not shown). The camera device 11 captures an image Limg of a landscape behind the vehicle V and acquires the images Limg as the landscape image Limg. The driving assist ECU 10 acquires data of the landscape image Limg acquired by the camera device 11 each time a predetermined time ts elapses. Hereinafter, the data Ldata of the landscape image Limg will be referred to as "the landscape image data Ldata".

The engine ECU 20 is electrically connected to an acceleration pedal operation amount sensor 21. The acceleration pedal operation amount sensor 21 detects an operation amount AP of an acceleration pedal 21a and outputs a signal representing the operation amount AP. The engine ECU 20 acquires the operation amount AP of the acceleration pedal 21*a* on the basis of the signal output from the acceleration pedal operation amount sensor 21. Hereinafter, the operation amount AP will be referred to as "the acceleration pedal operation amount AP".

As shown in FIG. 2, the vehicle V has an internal combustion engine 22. The engine 22 includes engine actuators 23 and an engine body 24. The engine actuators 23 include a throttle valve actuator (not shown) and the like.

The engine ECU 20 is electrically connected to the engine actuators 23. The engine ECU 20 activates the engine actuators 23 and the like to change a torque generated by the engine 22, thereby to adjust a force of driving the vehicle V.

The engine ECU 20 is electrically connected to a shift position sensor 25. The shift position sensor 25 detects a range RG at which a shift lever 25*a* is set and outputs a signal representing the range RG. The engine ECU 20 acquires the range RG at which the shift lever 25*a* is set on the basis of the signal output from the shift position sensor 25.

The shift lever 25*a* is set by a driver of the vehicle V at any of ranges described below.

(1) A first forward traveling range (a D-range) for traveling the vehicle V forward.

(2) A second traveling range (a B-range) for traveling the vehicle V forward.

(3) A neutral range (an N-range) for shutting off a transmission of the torque output from the engine 22 to driving wheels of the vehicle V.

(4) A rearward traveling range (an R-range) for traveling the vehicle V rearward.

(5) A parking range (a P-range) for maintaining the vehicle V at a stopped state.

The engine ECU 20 controls a reduction stage of an automatic transmission (not shown) including neutral and parking stage in response to the range RG at which the shift lever 25*a* is set.

As shown in FIGS. 1 and 2, the brake ECU 30 is electrically connected to a brake pedal operation amount sensor 31. The brake pedal operation amount sensor 31 detects an operation amount BP of a brake pedal 31*a* and outputs a signal representing the operation amount BP. The brake ECU 30 acquires the operation amount BP of the brake pedal 31*a* on the basis of the signal output from the brake pedal operation amount sensor 31. Hereinafter, the operation amount BP will be referred to as "the brake pedal operation amount BP".

As shown in FIG. 2, the vehicle V has a brake device 32. The brake device 32 includes brake actuators 33 and corresponding friction brake mechanisms 34. Each of the brake actuators 33 is a hydraulic pressure control actuator. Each of the friction brake mechanisms 34 includes brake discs 34*a* mounted on corresponding vehicle wheel, brake calipers 34*b* mounted on a vehicle body, brake pads (not shown) and the like.

The brake ECU 30 is electrically connected to the brake actuators 33. The brake ECU 30 controls an activation amount of each of the brake actuators 33 to adjust a friction braking force generated by the corresponding friction brake mechanism 34, thereby to adjust a braking force generated by the corresponding brake device 32 for braking the vehicle V.

<Summary of Operation of First Embodiment Apparatus>

Next, a summary of an operation of the first embodiment apparatus will be described. When the shift lever 25*a* is set at the rearward range (i.e., the R-range), the first embodiment apparatus performs a process for detecting a person image Himg in the landscape image Limg by a known pattern matching technique using the landscape image data Ldata acquired by the camera device 11. Hereinafter, the process for detecting the person image Himg in the landscape image Limg will be referred to as "the person image detection process".

Figure 3A:
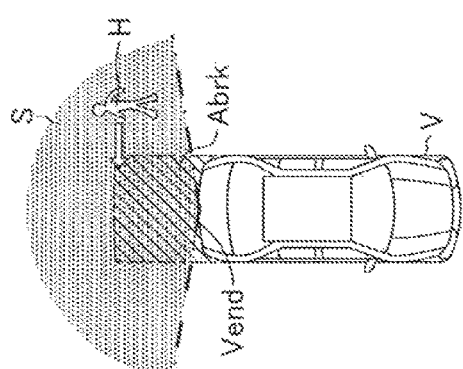
FIG. 3A is a view for showing a relationship between a position of a person and a position of the vehicle at a certain time.
Figure 3B:
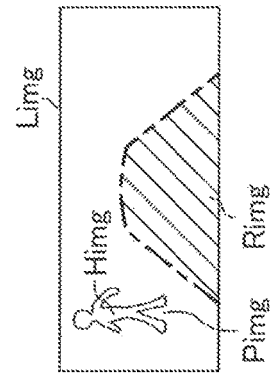
FIG. 3B is a view for showing a landscape image acquired when the relationship between the positions of the person and the vehicle corresponds to the relationship shown in FIG. 3A.

When a person H is in an image capture range S which the camera device 11 can capture the landscape image Limg as shown in FIG. 3A, an image Himg of the person H (hereinafter, the image Himg will be referred to as "the person image Himg") is included in the landscape image Limg as shown in FIG. 3B. When the person image Himg is included in the landscape image Limg, the first embodiment apparatus detects the person image Himg by the person image detection process using the pattern matching technique.

The first embodiment apparatus has stored image patterns or templates which are images expected to be included in the landscape image Limg as the person image Himg, respectively in the ROM of the first embodiment apparatus. The first embodiment apparatus compares the landscape Limg with the templates and detects an image in the landscape image Limg having a degree of a conformity to any of the templates equal to or larger than a predetermined degree as the person image Himg.

Figure 4:
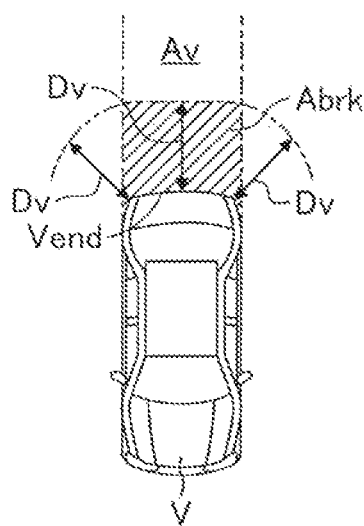
FIG. 4 is a view for showing a braking area.

Further, as shown in FIG. 4, in the first embodiment, a braking area Abrk has been set. The braking area Abrk is an area which the vehicle V may collide with a person H if the person H exists in the braking area Abrk. In particular, the braking area Abrk is an area defined by an overlap of a traveling scheduled area Av and an area within a range of a predetermined distance Dv from the rear end Vend of the vehicle V. The traveling scheduled area Av is an area which the vehicle V is expected to travel when the vehicle V travels straight rearward.

When the first embodiment apparatus detects the person image Himg, the first embodiment apparatus determines whether or not a person H corresponding to the person image Himg exists in the braking area Abrk on the basis of the person image position Pimg of the person image Himg in the landscape image Limg. In particular, as shown in FIG. 3, the first embodiment apparatus determines whether or not the person image Himg exists in a range Rimg of the landscape image Limg corresponding to the braking area Abrk. Hereinafter, the range Rimg of the landscape image Limg will be referred to as "the braking range Rimg".

For example, when the person H moves toward the braking area Abrk outside of the braking area Abrk as shown in FIG. 3A, the person image Himg exists outside of the braking range Rimg as shown in FIG. 3B. In this case, the first embodiment apparatus determines that the person H exists outside of the braking area Abrk.

Figure 3C:
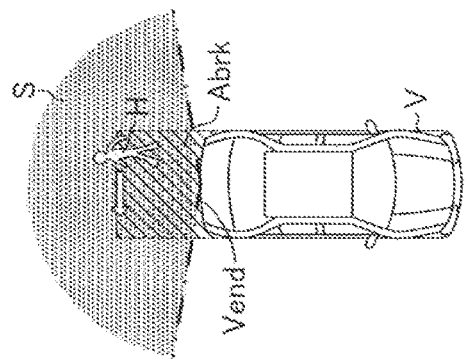
FIG. 3C is a view for showing the relationship between the positions of the person and the vehicle after the relationship between the positions of the person and the vehicle corresponds to the relationship shown in FIG. 3A.
Figure 3D:
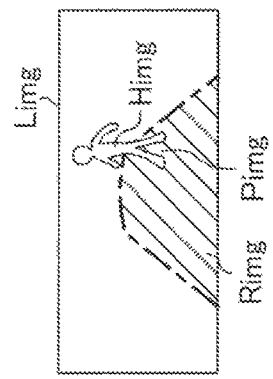
FIG. 3D is a view for showing the landscape image acquired when the relationship between the positions of the person and the vehicle corresponds to the relationship shown in FIG. 3C.

Thereafter, when the person H moves into the braking area Abrk as shown in FIG. 3C, the person image Himg exists in the braking range Rimg as shown in FIG. 3D. In this case, the first embodiment apparatus determines that the person H exists in the braking area Abrk. When the first embodiment apparatus determines that the person H exists in the braking area Abrk, the first embodiment apparatus starts an activation of the brake device 32 to brake the vehicle V, thereby to stop the vehicle V and maintain the vehicle V at the stopped state.

Figure 3E:
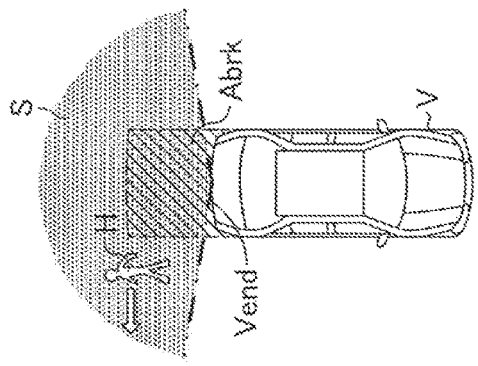
FIG. 3E is a view for showing the relationship between the positions of the person and the vehicle after the relationship between the positions of the person and the vehicle corresponds to the relationship shown in FIG. 3C.
Figure 3F:
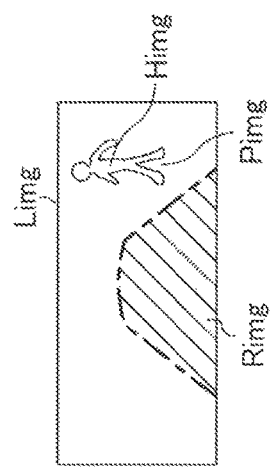
FIG. 3F is a view for showing the landscape image acquired when the relationship between the positions of the person and the vehicle corresponds to the relationship shown in FIG. 3E.

Thereafter, when the person H moves out of the braking area Abrk as shown in FIG. 3E, the person image Himg exists outside of the braking range Rimg. In this case, the first embodiment apparatus determines that the person H exists outside of the braking area Abrk. When the first embodiment apparatus determines that the person H exists outside of the braking area Abrk after starting the activation of the brake device 32, the first embodiment apparatus stops the activation of the brake device 32. Thereby, the braking of the vehicle V is stopped.

It should be noted that the first embodiment apparatus continues the activation of the brake device 32 until the first embodiment apparatus determines that the person H exists outside of the braking area Abrk after starting the activation of the brake device 32.

According to the first embodiment apparatus, when the person H may exist in the braking area Abrk and thus, the vehicle V traveling rearward may collide against the person H, the vehicle V is automatically braked. Thus, the vehicle V is prevented from colliding against the person H.

Figure 5A:
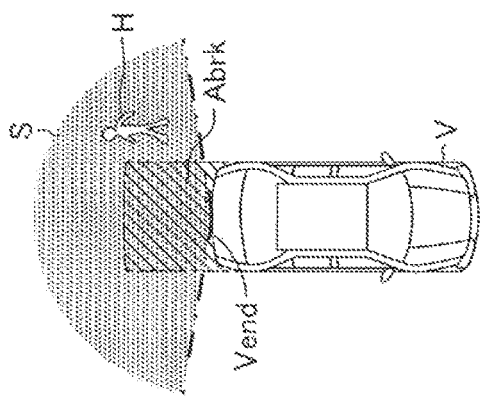
FIG. 5A is a view for showing the relationship between the positions of the person and the vehicle when a whole body of the person is included in the landscape image.
Figure 5B:
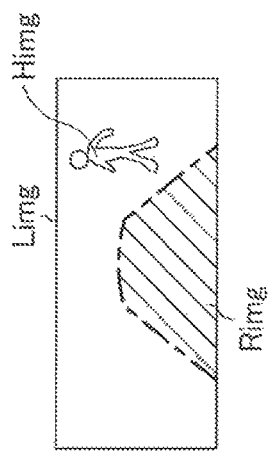
FIG. 5B is a view for showing the landscape image acquired when the relationship between the positions of the person and the vehicle corresponds to the relationship shown in FIG. 5A.

When the person H exists away from the rear end Vend of the vehicle V as shown in FIG. 5A, the camera device 11 can capture an image of a whole body of the person H. In this case, as shown in FIG. 5B, the person image Himg corresponding to the whole body of the person H is included in the landscape image Limg.

Figure 5C:
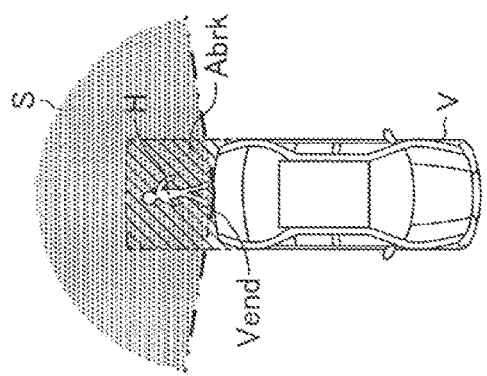
FIG. 5C is a view for showing the relationship between the positions of the person and the vehicle when only a part of the body of the person is included in the landscape image.
Figure 5D:
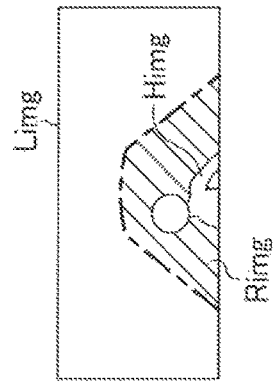
FIG. 5D is a view for showing the landscape image acquired when the relationship between the positions of the person and the vehicle corresponds to the relationship shown in FIG. 5C.

On the other hand, when the person H exists near the rear end Vend of the vehicle V as shown in FIG. 5C, the camera device 11 can capture only an image of a part of the body of the person H. In this case, as shown in FIG. 5D, the person image Himg corresponding to the part of the body of the person H is only included in the landscape image Limg. When the template corresponding to the person image Himg corresponding to the part of the body of the person H is not stored in the ROM of the first embodiment apparatus, the first embodiment apparatus cannot detect the person image Himg by the person image detection process using the pattern matching technique.

Further, when the part of the body of the person H is behind a stationary object such as a post of a building or when the person image Himg corresponding to the whole body of the person H is included in the landscape image Limg, but a boundary between the person image Himg and an image around the person image Himg in the landscape image Himg is not clear or the like, the first embodiment apparatus cannot detect the person image Himg by the person image detection process using the pattern matching technique.

As described above, even when the person H exists in the image capture range S, a situation that the first embodiment apparatus cannot detect the person image Himg by the person image detection process using the pattern matching technique may occurs. Hereinafter, this situation will be referred to as "the non-detection situation".

When the first embodiment apparatus cannot detect the person image Himg by the person image detection process using the pattern matching technique until the first embodiment apparatus determines that the person H exists outside of the braking area Abrk after starting the activation of the brake device 32, the first embodiment apparatus determines that the non-detection situation occurs.

When the first embodiment apparatus determines that the non-detection situation occurs, the first embodiment apparatus performs a process for detecting an image Mimg of a moving object such as the moving person H included in the landscape image Limg by a known optical flow technique. Hereinafter, the image Mimg will be referred to as "the moving object image Mimg".

Figure 6:
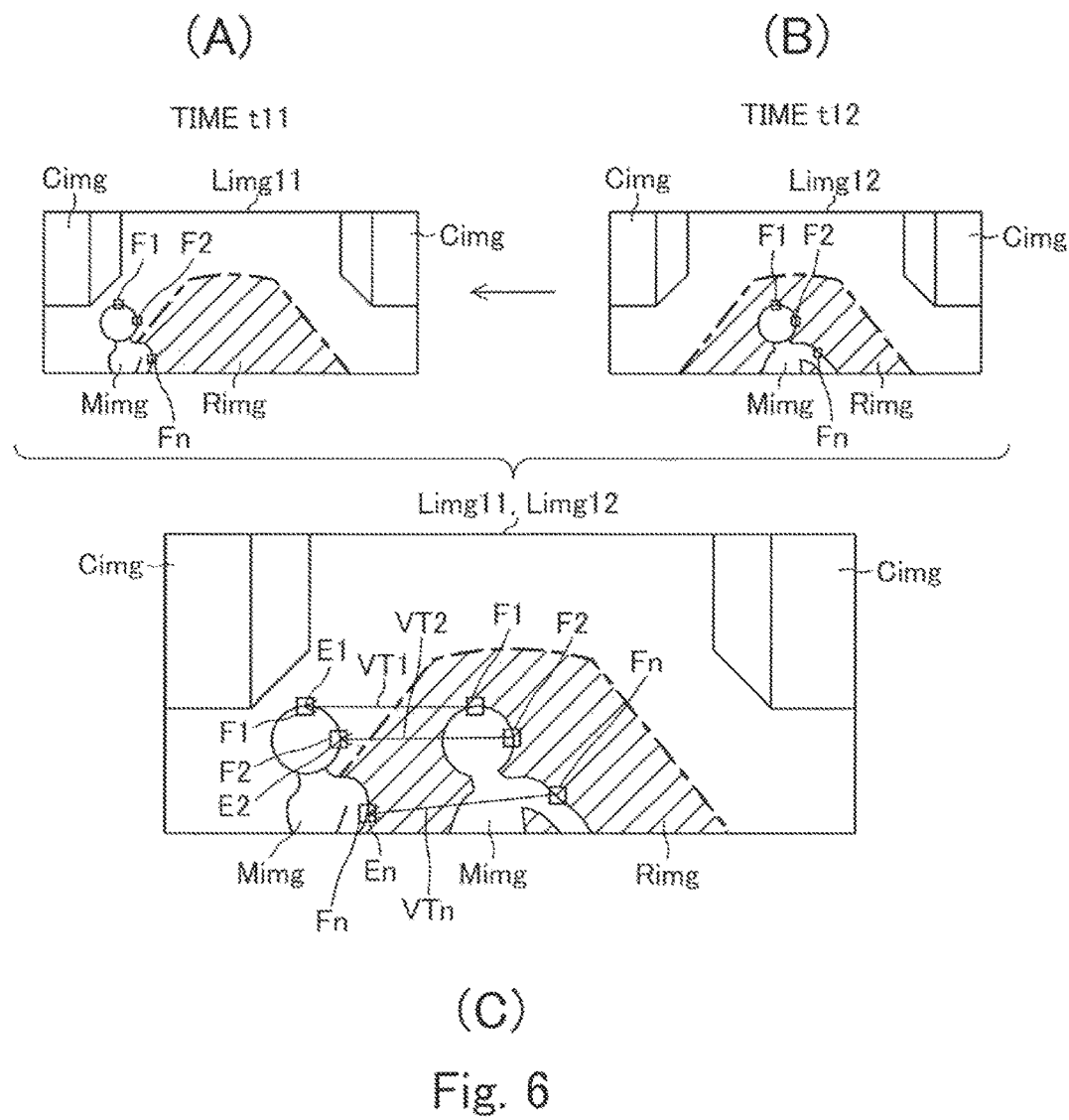
FIG. 6 is a view used for describing an acquisition of motion vectors, (A) of FIG. 6 is a view for showing the landscape image acquired at a certain time, (B) of FIG. 6 is a view for showing the landscape image acquired immediately before the landscape image shown in (A) of FIG. 6 is acquired and (C) of FIG. 6 is a view for showing an image acquired by superimposing the landscape images shown in (A) and (B) of FIG. 6.

In particular, when the non-detection situation occurs after the first embodiment apparatus starts the activation of the brake device 32, the first embodiment apparatus acquires characteristic points Fn (n is an integer number equal to or larger than "1") included in the landscape image Limg11 as shown in (A) of FIG. 6. The landscape image Limg 11 is the landscape image Limg acquired at a time t11 closest to the present time among the landscape images Limg acquired each time a predetermined time elapses. Hereinafter, the characteristic point Fn acquired from the landscape image Limg11 will be referred to as "the first characteristic point Fn". In addition, the first embodiment apparatus acquires characteristic points Fn (n is an integer equal to or larger than "1") included in the landscape image Limg12 as shown in (B) of FIG. 6. The landscape image Limg12 is the landscape image Limg acquired at a time t12 immediately before the time t11 (i.e., at the time t12 before the time t11 by a predetermined time ts) among the landscape images Limg acquired each time the predetermined time elapses. The characteristic points Fn acquired from the landscape image Limg12 correspond to the first characteristic points Fn, respectively. Hereinafter, the characteristic points Fn acquired from the landscape image Limg12 will be referred to as "the second characteristic points Fn", respectively.

As shown in (C) of FIG. 6, the first embodiment apparatus acquires motion vectors VTn or flow vectors VTn (n is an integer number equal to or larger than "1") of the characteristic points Fn, respectively using the first and second characteristic points Fn. In particular, the first embodiment apparatus acquires the motion vectors VTn each defined by the second characteristic point Fn as a start point and the corresponding first characteristic point Fn as an end point.

The first embodiment apparatus performs the process for detecting the moving object image Mimg in the landscape image Limg by the known optical flow technique on the basis of the acquired motion vectors VTn. In particular, the first embodiment apparatus performs a process for selecting the motion vectors having directions and magnitudes similar to each other from the motion vectors VTn as motion vectors VTm (m is an integer number equal to or larger than "1" and equal to or smaller than "n") regarding the moving object.

When the first embodiment apparatus can select the motion vectors VTm regarding the moving object, that is, when the first embodiment apparatus can detect the moving object image Mimg, the first embodiment apparatus determines whether or not the person H exists outside of the braking area Abrk on the basis of positions of end positions Em of all of the selected motion vectors VTm.

When at least one of the end points Em of the motion vectors VTm exists in the braking range Rimg, the first embodiment apparatus determines that the person H exists in the braking area Abrk. When the first embodiment apparatus determines that the person H exists in the braking area Abrk, the first embodiment apparatus continues the activation of the brake device 32. Thereby, the braking of the vehicle V continues.

On the other hand, when the end points Em of all of the motion vectors VTm exist outside of the braking range Rimg, the first embodiment apparatus determines that the person H exists outside of the braking area Abrk. When the first embodiment apparatus determines that the person H exists outside of the braking area Abrk, the first embodiment apparatus stops the activation of the brake device 32. Thereby, the braking of the vehicle V is stopped.

As described above, when the non-detection situation does not occur, the first embodiment apparatus determines whether or not the person H exists in the braking area Abrk on the basis of the person image position Pimg of the person image Himg detected by using the pattern matching technique as well as whether or not the person H exists outside of the braking area Abrk on the basis of the person image position Pimg. The pattern matching technique is a technique which can detect the person image Himg corresponding to the moving person H as well as the person image Himg corresponding to the stationary person H. On the other hand, the optical flow technique is a technique which can detect the moving person H as the moving object, but cannot detect the stationary person H as the moving object.

Therefore, the first embodiment apparatus detects the person image Himg by the pattern matching technique when the non-detection situation does not occur. Thus, the first embodiment apparatus can accurately determine whether or not the person H exists in the braking area Abrk, compared with a case that the first embodiment apparatus detects the moving object image Mimg by the optical flow technique. Therefore, the vehicle V is surely prevented from colliding against the person H.

On the other hand, when the non-detection situation occurs, the first embodiment apparatus detects the moving object image Mimg by the optical flow technique. The optical flow technique is a technique which can detect the moving person H as the moving object even when only the part of the body of the person H is included in the landscape image Limg. Therefore, even when the non-detection situation occurs after the first embodiment apparatus starts the activation of the brake device 32, the first embodiment apparatus can detect the person H as the moving object and as a result, determine whether or not the person H exists outside of the braking area Abrk. Thus, the first embodiment apparatus can appropriately determine a timing of stopping the activation of the brake device 32. Therefore, when the non-detection situation occurs after the first embodiment apparatus starts the activation of the brake device 32, a continuation time of activating the brake device 32 is prevented from increasing excessively.

In addition, even when the non-detection situation occurs, the first embodiment apparatus can accurately determine whether or not the person H exists outside of the braking area Abrk and thus, a possibility that the first embodiment apparatus stops the activation of the brake device 32 before the person H moves out of the braking area Abrk can be small. Thus, when the non-detection situation occurs, a possibility that the vehicle V collides against the person H can be small.

It should be noted that when the first embodiment apparatus cannot detect the moving object image Mimg by the optical flow technique, the first embodiment apparatus stops the activation of the brake device 32 at a time when a continuation time T1 during which the non-detection situation has occurred becomes equal to or larger than a predetermined time T1th. The predetermine time T1th may be set as a constant time sufficient for the person H moving out of the braking area Abrk on the basis of the person image position Pimg of the person image Himg acquired immediately before the non-detection situation occurs. Hereinafter, the continuation time T1 will be referred to as "the non-detection situation continuation time T1".

<Concrete Operation of First Embodiment Apparatus>

Next, a concrete operation of the first embodiment apparatus will be described. The CPU of the driving assist ECU 10 of the first embodiment apparatus is configured or programmed to execute a routine shown by a flowchart in FIG. 7 each time a predetermined time elapses. Hereinafter, the CPU of the driving assist ECU 10 will be simply referred to as "the CPU". At a predetermined timing, the CPU starts a process from a step 700 of FIG. 7 and then, proceeds with the process to a step 705 to determine whether or not the shift lever 25a is set at the rearward traveling range (i.e., the R-range).

When the shift lever 25a is set at the rearward traveling range, the CPU determines "Yes" at the step 705 and then, sequentially executes processes of steps 710 and 712 described below. Thereafter, the CPU proceeds with the process to a step 715.

Step 710: The CPU acquires the landscape image data Ldata from the camera device 11.

Step 712: The CPU executes the person image detection process for detecting the person image Himg in the landscape image Limg by the pattern matching technique using the landscape image data Ldata and the templates.

When the CPU proceeds with the process to the step 715, the CPU determines whether or not the CPU detects the person image Himg at the step 712. When the CPU detects the person image Himg, the CPU determines "Yes" at the step 715 and then, sequentially executes processes of steps 717 and 720 described below. Thereafter, the CPU proceeds with the process to a step 725.

Step 717: The CPU clears the non-detection situation continuation time T1 during which the CPU has determined that the person image Himg is not detected at a step 810 of FIG. 8 described below.

Step 720: The CPU acquires the person image position Pimg of the person image Himg in the landscape image Limg using the landscape image data Ldata.

When the CPU proceeds with the process to the step 725, the CPU determines whether or not the person image Himg exists in the braking range Rimg in the landscape image Limg on the basis of the person image position Pimg acquired at the step 720. When the person image Himg exists in the ring, the CPU determines "Yes" at the step 725 and then, proceeds with the process to a step 730 to send a brake activation command signal Sbrk for activating the brake device 32 to the brake ECU 30. Thereafter, the CPU proceeds with the process to a step 795 to terminate the execution of this routine once.

When the brake ECU 30 receives the brake activation command signal Sbrk from the driving assist ECU 10, the brake ECU 30 activates the brake device 32. Hereinafter, the activation of the brake device 32 by the brake activation command signal Sbrk will be referred to as "the automatic activation of the brake device 32".

It should be noted that when the automatic activation of the brake device 32 has been already performed upon the execution of the process of the step 730, the CPU does not send the brake activation command signal Sbrk to the brake ECU 30 at the step 730. In this case, the automatic activation of the brake device 32 continues.

On the other hand, when the person image Himg does not exist in the braking range Rimg upon the execution of the process of the step 725, that is, when the person image Himg exists outside of the braking range Rimg, the CPU determines "No" at the step 725 and then, proceeds with the process to a step 735 to send a brake stop command signal Sstp for stopping the automatic activation of the brake device 32 to the brake ECU 30. Thereafter, the CPU proceeds with the process to the step 795 to terminate the execution of this routine once.

When the brake ECU 30 receives the brake stop command signal Sstp from the driving assist ECU 10, the brake ECU 30 stops the activation of the brake device 32. Hereinafter, the stop of the activation of the brake device 32 by the brake stop command signal Sstp will be referred to as "the automatic activation stop of the brake device 32".

It should be noted that when the automatic activation of the brake device 32 has been already stopped upon the execution of the process of the step 735, the CPU does not send the brake stop command signal Sstp to the brake ECU 30 at the step 735. In this case, the automatic activation stop of the brake device 32 continues.

When the CPU does not detect the person image Himg in the landscape image Limg upon the execution of the process of the step 715, the CPU determines "No" at the step 715 and then, proceeds with the process to a step 740 to determine whether or not the automatic activation of the brake device 32 is performed.

When the CPU proceeds with the process to the step 740 after sending the brake activation command signal Sbrk to the brake ECU 30 at the step 730, the automatic activation of the brake device 32 is performed. In this case, the CPU determines "Yes" at the step 740 and then, proceeds with the process to a step 745 to execute a braking stop routine shown by a flowchart in FIG. 8.

Figure 8:
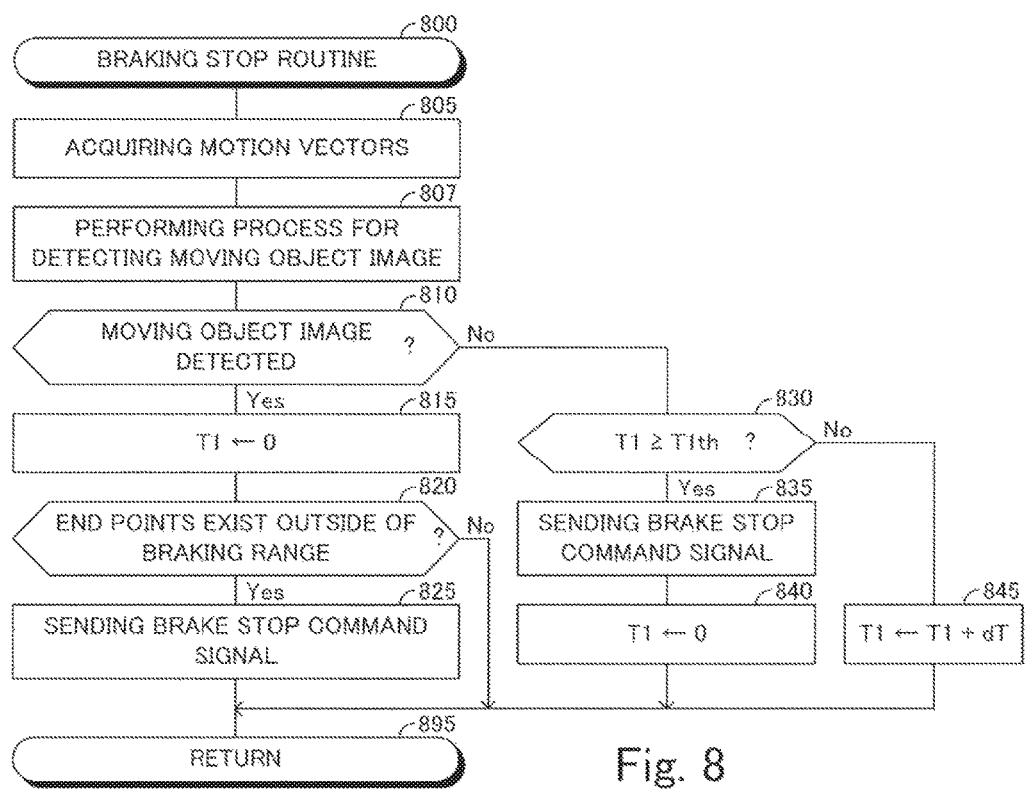
FIG. 8 is a flowchart for showing a routine executed by the CPU of the ECU of the brake control apparatus according to the first embodiment.

Therefore, when the CPU proceeds with the process to the step 745, the CPU starts a process from a step 800 of FIG. 8 and then, sequentially executes processes of steps 805 and 807 described below. Thereafter, CPU proceeds with the process to a step 810.

Step 805: The CPU acquires the first characteristic points Fn included in the landscape image Limg11 and the second characteristic points Fn included in the landscape image Limg12. The CPU acquires the landscape image Limg11 on the basis of the landscape image data Ldata acquired at the step 710 of FIG. 7 this time execution of this routine. The CPU acquires the landscape image Limg 12 on the basis of the landscape image data Ldata acquired at the step 710 of FIG. 7 last time execution of this routine. The acquired second characteristic points Fn correspond to the acquired first characteristic points Fn, respectively. Further, the CPU acquires the motion vectors VTn of the first or second characteristic points Fn by using the first and second characteristic points Fn.

Step 807: The CPU executes a process for detecting the moving object image Mimg in the landscape image Limg by using the motion vectors VTn. That is, the CPU executes a process for selecting the motion vectors having the directions and magnitudes similar to each other from the motion vectors VTn as the motion vectors VTm regarding the moving object, in other words, the moving object image Mimg.

When the CPU proceeds with the process to the step 810, the CPU determines whether or not the CPU detects the moving object image Mimg at the step 805. When the CPU detects the moving object image Mimg, the CPU determines "Yes" at the step 810 and then, proceeds with the process to a step 815 to clear the non-detection situation continuation time T1 during which the CPU has determined "No" at the step 810, that is, the non-detection situation has occurred. Thereafter, the CPU proceeds with the process to as a step 820 to determine whether or not the end points Em of all of the motion vectors VTm regarding the moving object image Mimg exist outside of the braking range Rimg.

When the end points Em of all of the motion vectors VTm regarding the moving object image Mimg exist outside of the braking range Rimg, the CPU determines "Yes" at the step 820 and then, proceeds with the process to a step 825 to send the brake stop command signal Sstp for stopping the automatic activation of the brake device 32 to the brake ECU 30. Thereafter, the CPU proceeds with the process to the step 795 of FIG. 7 via a step 895.

As described above, when the brake ECU 30 receives the brake stop command signal Sstp, the brake ECU 30 stops the automatic activation of the brake device 32.

Figure 7:
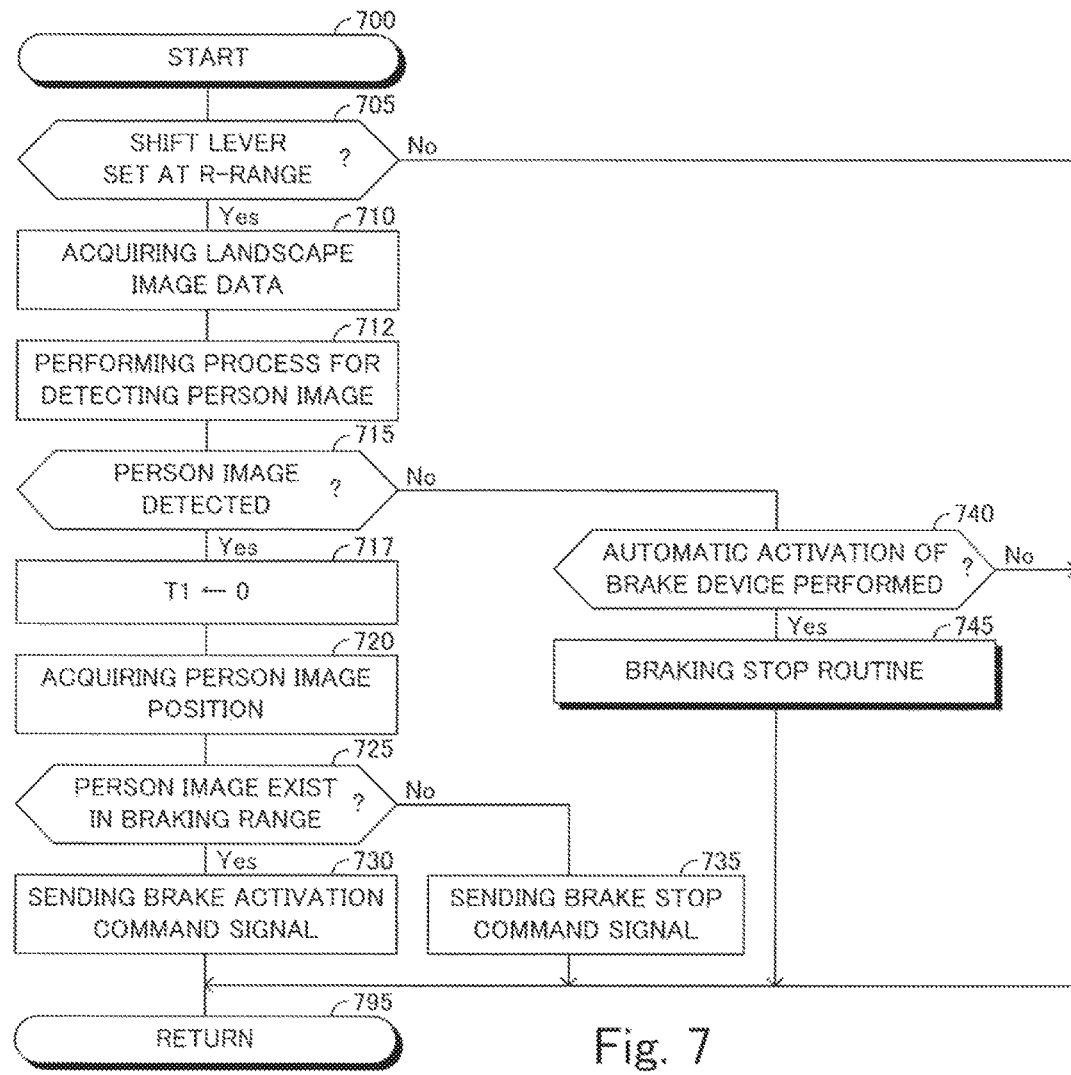
FIG. 7 is a flowchart for showing a routine executed by a CPU of an ECU of the brake control apparatus according to a first embodiment of the present invention.

On the other hand, when at least one of the end points Em of the motion vectors VTm regarding the moving object image Mimg exists in the braking range Rimg upon the execution of the process of the step 820, the CPU determines "No" at the step 820 and then, proceeds with the process to the step 795 of FIG. 7 via the step 895. In this case, the automatic activation of the brake device 32 continues.

When the CPU does not detect the moving object image Mimg upon the execution of the process of the step 810, the CPU determines "No" at the step 810 and then, proceeds with the process to a step 830 to determine whether or not the non-detection situation continuation time T1 is equal to or larger than the predetermined time T1th. When the non-detection situation continuation time T1 is equal to or larger than the predetermined time T1th, the CPU determines "Yes" at the step 830 and then, sequentially executes processes of steps 835 and 840 described below. Thereafter, the CPU proceeds with the process to the step 795 of FIG. 7 via the step 895.

Step 835: The CPU sends the brake stop command signal Sstp for stopping the automatic activation of the brake device 32 to the brake ECU 30.

Step 840: The CPU clears the non-detection situation continuation time T1.

On the other hand, when the non-detection situation continuation time T1 is smaller than the predetermined time T1th upon the execution of the process of the step 830, the CPU determines "No" at the step 830 and then, proceeds with the process to a step 845 to increase the non-detection situation continuation time T1 by a time dT corresponding to an execution time interval of this routine. Thereafter, the CPU proceeds with the process to the step 795 of FIG. 7 via the step 895. In this case, the automatic activation of the brake device 32 continues.

It should be noted that when the automatic activation of the brake device 32 is not performed upon the execution of the process of the step 740 of FIG. 7, the CPU determines "No" at the step 740 and then, proceeds with the process directly to the step 795 to terminate the execution of this routine once.

Further, when the shift lever 25a is not set at the rearward traveling range upon the execution of the process of the step 705 of FIG. 7, the CPU determines "No" at the step 705 and then, proceeds with the process directly to the step 795 to terminate the execution of this routine once.

The concrete operation of the first embodiment apparatus has been described. According to the operation of the first embodiment apparatus, when the person H exists in the braking area Abrk (see the determination "Yes" at the step 725), the brake device 32 is activated (see the process of the step 730). As a result, the vehicle V is prevented from colliding against the person H.

Also when the non-detection situation occurs after the activation of the brake device 32 is started (see the determination "No" at the step 715 and the determination "Yes" at the step 740), it is possible to determine whether or not the person H exists outside of the braking area Abrk (see the process of the step 820). As a result, the continuation time of activating the brake device 32 is prevented from increasing excessively.

<Summary of Operation of Second Embodiment Apparatus>

Next, the brake control apparatus according to a second embodiment of the present invention (hereinafter, this apparatus will be referred to as "the second embodiment apparatus") will be described. The configuration of the second embodiment apparatus is the same as that of the first embodiment apparatus except that the second embodiment apparatus uses the two landscape images which have been already acquired at different times before the non-detection situation occurs for determining whether or not the person H exists outside of the braking area Abrk while the first embodiment apparatus uses the two landscape images Limg11 and Limg12 acquired at the different times t11 and t12 after the non-detection situation occurs for determining whether or not the person H exists outside of the braking area Abrk.

In particular, similar to the first embodiment apparatus, when the shift lever 25a is set at the rearward traveling range, the second embodiment apparatus determines whether or not the person H exists in the braking area Abrk on the basis of the person image position Pimg of the person image Himg detected by the person image detection process by the pattern matching technique. When the person H exists in the braking area Abrk, the second embodiment apparatus starts the activation of the brake device 32 to brake the vehicle V, thereby to stop the vehicle V and maintain the vehicle V at the stopped condition.

Figure 9:
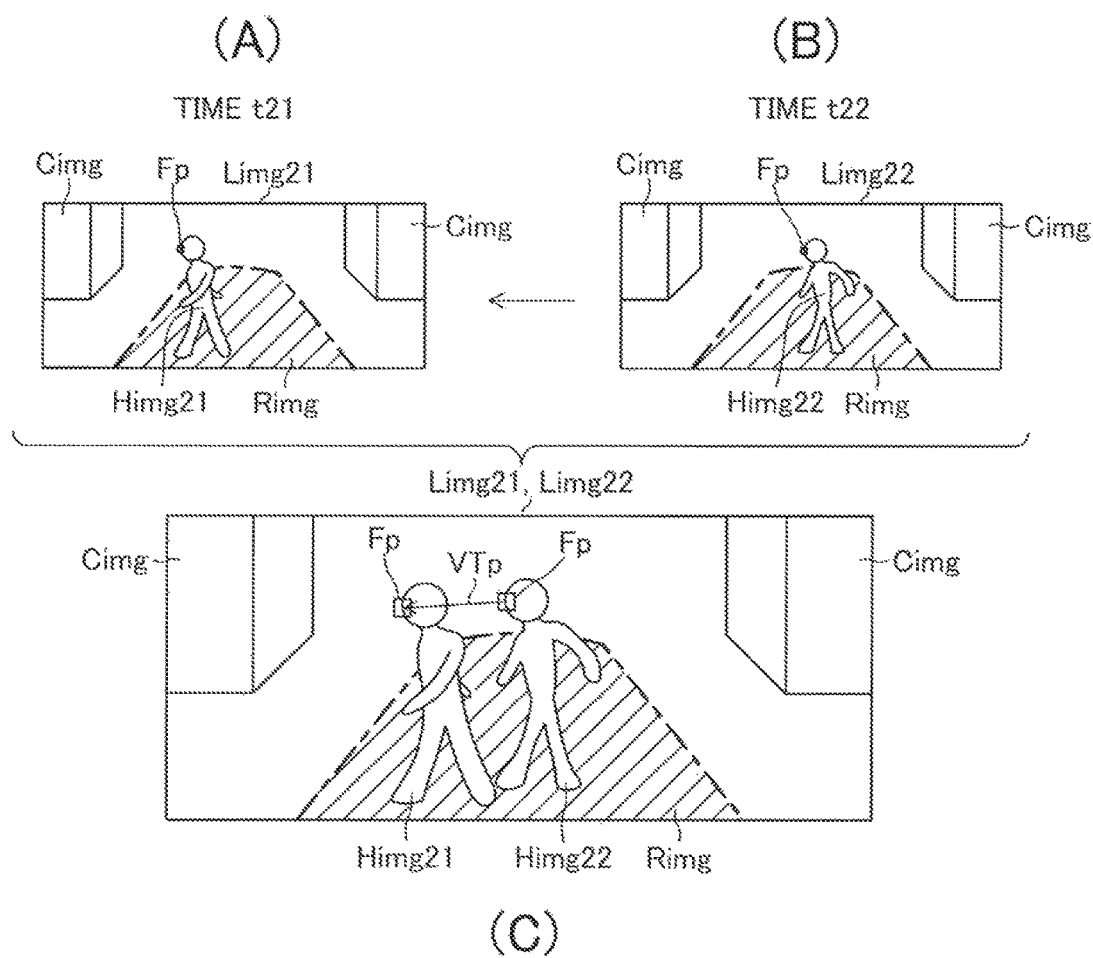
FIG. 9 is a view used for describing an acquisition of a motion vector, (A) of FIG. 9 is a view for showing the landscape image acquired at a certain time, (B) of FIG. 9 is a view for showing the landscape image acquired immediately before the landscape image shown in (A) of FIG. 9 is acquired and (C) of FIG. 9 is a view for showing an image acquired by superimposing the landscape images shown in (A) and (B) of FIG. 9.

On the other hand, in contrast to the first embodiment apparatus, when the non-detection situation occurs after the activation of the brake device 32 is started, the second embodiment apparatus acquires a particular characteristic point Fp of the person image Himg21 included in the landscape image Limg21 as shown in (A) of FIG. 9. The landscape image Limg21 is the landscape image Limg acquired at a time t21 immediately before the non-detection situation occurs among the landscape images Limg acquired each time a predetermined time elapses. Hereinafter, the particular characteristic point Fp acquired from the landscape image Limg21 will be referred to as "the first characteristic point Fp". In addition, the second embodiment apparatus acquires a characteristic point Fp of the person image Himg22 included in the landscape image Limg22 as shown in (B) of FIG. 9. The landscape image Limg22 is the landscape image Limg acquired at a time t22 immediately before the time t21 among the landscape images Limg acquired each time a predetermined time elapses. Hereinafter, the characteristic point Fp acquired from the landscape image Limg22 will be referred to as "the second characteristic point Fp". The second characteristic point Fp corresponds to the first characteristic point Fp.

As shown in (C) of FIG. 9, the second embodiment apparatus acquires the motion vector VTp of the first or second characteristic point Fp by using the first and second characteristic points Fp.

Further, the second embodiment apparatus acquires a position Pb of the person image Himg in the landscape image Limg21 by using the landscape image data Ldata acquired at the time t21. Hereinafter, the position Pb will be referred to as "the base position Pb". In addition, the second embodiment apparatus acquires a moving direction Dh and a moving speed SPD of the person H on the basis of the motion vector VTp. The moving speed SPD of the person H is acquired by dividing a moving amount Dm of the person H represented by the motion vector VTp by a time dt between the time t21 and the time t22 (SPD=Dm/dt).

The second embodiment apparatus applies the base position Pb, the moving direction Dh of the person H and the moving speed SPD of the person H to a look-up table MapTreq(Pb,Dh,SPD) to acquire a predetermined time Treq. The predetermined time Treq is a time expected to be required for the person H to move out from the braking area Abrk after the non-detection situation occurs. The look-up table MapTreq(Pb,Dh,SPD) has been previously obtained and stored in the ROM of the driving assist ECU 10.

Figure 10A:
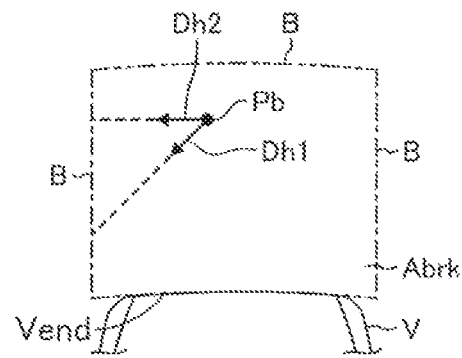
FIG. 10A is a view used for describing a predetermined time when the person does not walk toward the vehicle.

When the moving direction Dh corresponds to a direction Dh1 or Dh2 which directs toward a boundary line B of the braking area Abrk as shown in FIG. 10A, the predetermined time Treq acquired from the look-up table MapTreq(Pb,Dh,SPD) is a time required for the person H to move out from the braking area Abrk when the person H moves at the acquired moving speed SPD in the acquired moving direction Dh from the base position Pb. Hereinafter, the boundary line B will be referred to as "the braking area boundary line B".

Figure 10B:
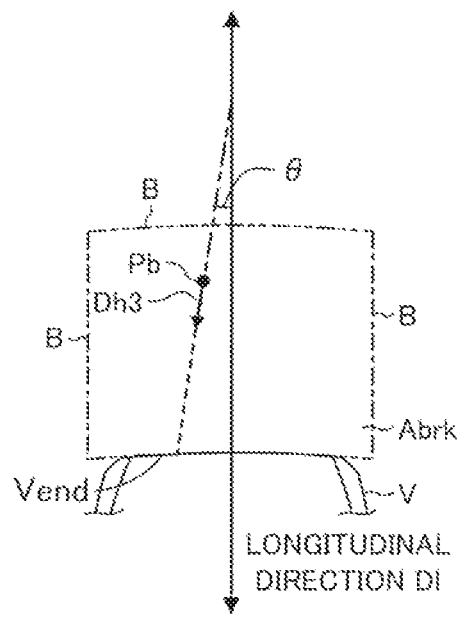
FIG. 10B is a view used for describing a predetermined time when the person walks toward the vehicle.

On the other hand, when the moving direction Dh corresponds to a direction Dh3 which directs toward the vehicle V as shown in FIG. 10B, the predetermined time Treq acquired from the look-up table MapTreq(Pb,Dh,SPD) is a time required for the person H to move out from the braking area Abrk when the person H moves to a position near the vehicle V and then, moves after changing the moving direction Dh to a direction which directs toward the braking area boundary line B.

Therefore, when the moving direction Dh corresponds to the direction Dh3 which directs toward the vehicle V, the predetermined time Treq acquired by the look-up table MapTreq(Pb,Dh,SPD) increases as a distance between the base position Pb and the rear end Vend of the vehicle V increases. Further, the predetermined time Treq acquired by the look-up table MapTreq(Pb,Dh,SPD) increases as an angle θ defined between the moving direction Dh and a longitudinal direction D1 of the vehicle V decreases. In addition, the predetermined time Treq acquired by the look-up table MapTreq(Pb,Dh,SPD) increases as the moving speed SPD decreases.

The second embodiment apparatus sets a value obtained by multiplying the predetermined time Treq by a coefficient K larger than "1" as a threshold time T2th (T2th=Treq×K). Therefore, the threshold time T2th is a time correlating with the predetermined time Treq.

The second embodiment apparatus continues to perform the automatic activation of the brake device 32 until the threshold time T2th elapses after the non-detection situation occurs. The second embodiment apparatus stops the automatic activation of the brake device 32 when the threshold time T2th elapses.

As described above, when the non-detection situation occurs, the second embodiment apparatus sets a time sufficient for the person H to move out from the braking area Abrk as the threshold time T2th by using the person image Himg detected before the non-detection situation occurs. Then, the second embodiment apparatus stops the automatic activation of the brake device 32 when the threshold time T2th elapses. Thus, even when the non-detection situation occurs after the automatic activation of the brake device 32 is started, a continuation time during which the automatic activation of the brake device 32 continues, is prevented from increasing excessively.

In addition, when the non-detection situation occurs, the second embodiment apparatus stops the automatic activation of the brake device 32 at a time when the person H moves surely out from the braking area Abrk. Thus, even when the non-detection situation occurs, the possibility that the vehicle V collides against the person H can be small.

<Concrete Operation of Second Embodiment Apparatus>

Next, a concrete operation of the second embodiment apparatus will be described. The CPU of the driving assist ECU 10 of the second embodiment apparatus (hereinafter, the CPU will be simply referred to as "the CPU") is configured or programmed to execute a routine shown by a flowchart in FIG. 11 each time a predetermined time elapses. Therefore, at a predetermined timing, the CPU starts a process from a step 1100 of FIG. 11.

Figure 11:
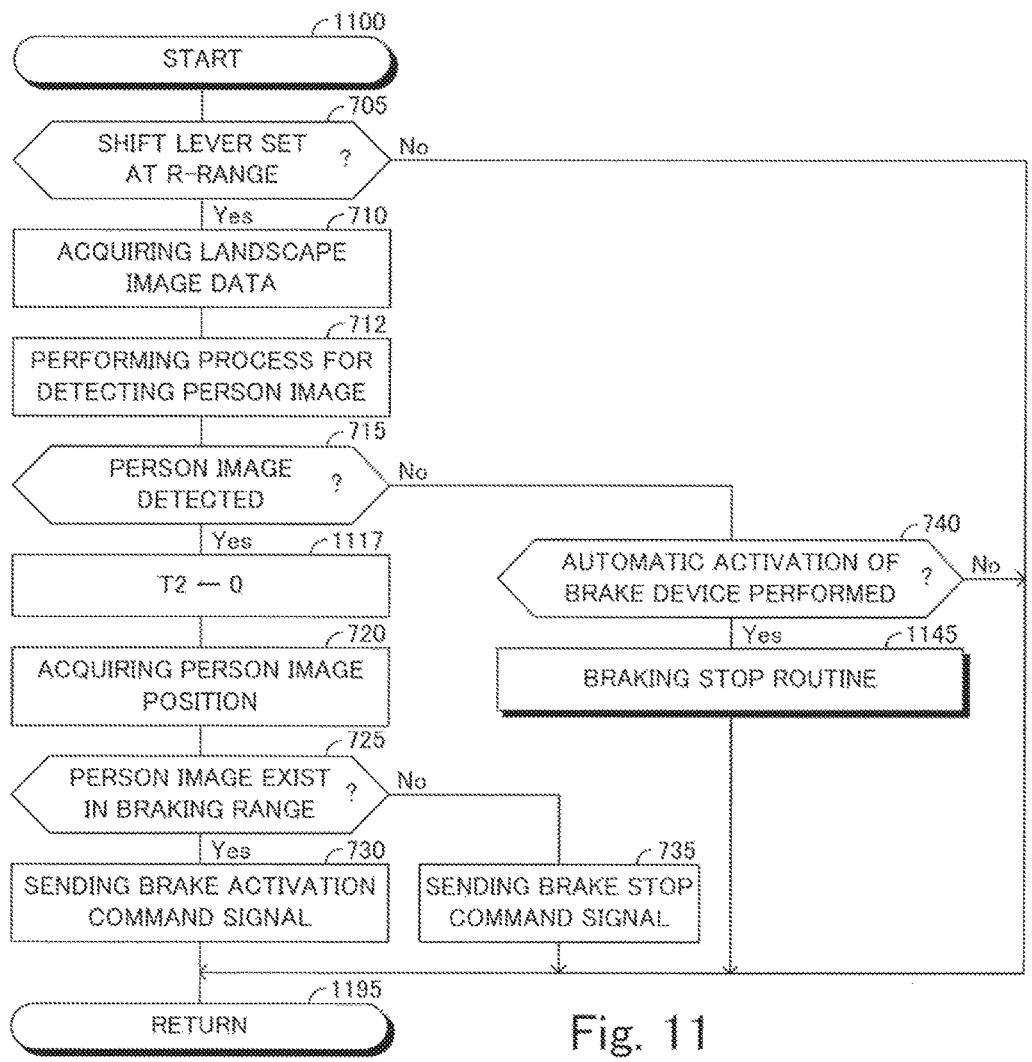
FIG. 11 is a flowchart for showing a routine executed by the CPU of the ECU of the brake control apparatus according to a second embodiment of the present invention.

Processes of steps 705 to 715 and 720 to 740 of FIG. 11 are the same as the steps 705 to 715 and 720 to 740 of FIG. 7, respectively. Therefore, below, mainly, processes of steps of FIG. 11 different from the processes of the steps of FIG. 7 will be described.

Figure 12:
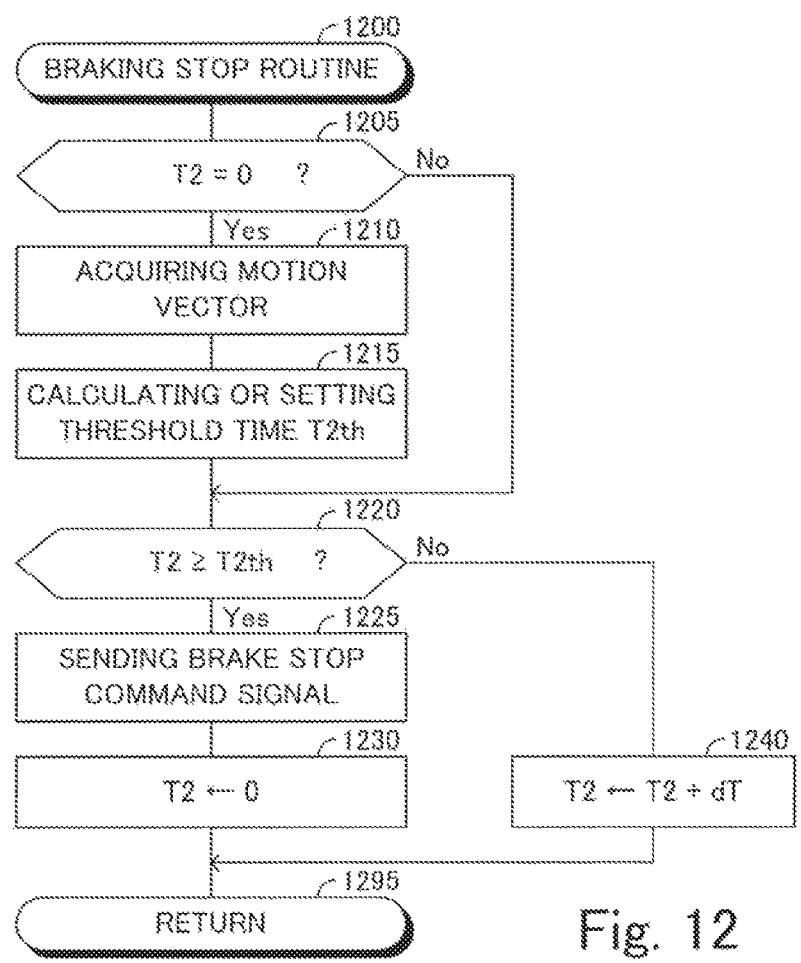
FIG. 12 is a flowchart for showing a routine executed by the CPU of the ECU of the brake control apparatus according to the second embodiment.

When the automatic activation of the brake device 32 is performed upon the execution of the process of the step 740, the CPU determines "Yes" at the step 740 and then, proceeds with the process to as step 1145 to execute a braking stop routine shown by a flowchart in FIG. 12. Therefore, when the CPU proceeds with the process to the step 1145, the CPU starts a process from a step 1200 and then, proceeds with the process to a step 1205 to determine whether or not a time T2 is zero. The time T2 is a time during which the CPU has determined "No" at the step 715 of FIG. 11, that is, the non-detection situation has occurred. Hereinafter, the time T2 will be referred to as "the elapsed time T2".

When the elapsed time T2 is zero, the CPU determines "Yes" at the step 1205 and then, sequentially executes processes of steps 1210 and 1215 described below. Thereafter, the CPU proceeds with the process to a step 1220.

Step 1210: The CPU acquires the first characteristic point Fp (i.e., the particular characteristic point Fp) of the person image Himg21 included in the landscape image Limg21 acquired at the time 21 immediately before the non-detection situation occurs and acquire the second characteristic point Fp (i.e., the particular characteristic point Fp) of the person image Himg22 included in the landscape image Limg22 acquired at the time t22 immediately before acquiring the person image Himg21. It should be noted that the second characteristic point Fp corresponds to the first characteristic point Fp. Further, the CPU acquires the motion vector VTp of the first or second characteristic point Fp by using the first and second characteristic points Fp.

Step 1215: The CPU applies the base position Pb of the person image Himg21 in the landscape image Limg21 acquired at the time t21 and the moving direction Dh and the moving speed SPD of the person H acquired on the basis of the motion vector VTp to the look-up table MapTreq(Pb, Dh,SPD) to acquire the predetermined time Treq and calculates the threshold time T2th by multiplying the predetermined time Treq by the coefficient K larger than "1" (T2th=Treq×K).

When the elapsed time T2 is larger than zero upon the execution of the process of the step 1205, the CPU determines "No" at the step 1205 and then, proceeds with the process directly to the step 1220.

When the CPU proceeds with the process to the step 1220, the CPU determines whether or not the elapsed time T2 is equal to or larger than the threshold time T2th. When the elapsed time T2 is equal to or larger than the T2th, that is, when it is estimated that the person H exists outside of the braking area Abrk, the CPU determines "Yes" at the step 1220 and then, sequentially executes processes of steps 1225 and 1230 described below. Thereafter, the CPU proceeds with the process to a step 1195 of FIG. 11 via a step 1295.

Step 1225: The CPU sends the brake stop command signal Sstp to the brake ECU 30.

Step 1230: The CPU clears the elapsed time T2.

On the other hand, when the elapsed time T2 is smaller than the threshold time T2th upon the execution of the process of the step 1220, the CPU determines "No" at the step 1220 and then, proceeds with the process to a step 1240 to increase the elapsed time T2 by the time dT corresponding to the execution time interval of this routine. Thereafter, the CPU proceeds with the process to the step 1195 of FIG. 11 via the step 1295.

It should be noted that when the CPU detects the person image Himg upon the execution of the process of the step 715 of FIG. 11, the CPU determines "Yes" at the step 715 and then, proceeds with the process to a step 1117 to clear the elapsed time T2. Thereafter, the CPU proceeds with the process to the step 720.

The concrete operation of the second embodiment apparatus has been described. According to the operation of the second embodiment apparatus, when the person H exists in the braking area Abrk, the brake device 32 is activated (see the process of the step 730). As a result, the vehicle V is prevented from colliding against the person H.

Further, even when the non-detection situation occurs after the activation of the brake device 32 is started (see the determination "No" at the step 715 and the determination "Yes" at the step 740), it is possible to determine whether or not the person H exists outside of the braking area Abrk (see the process of the step 1220). As a result, the continuation time of activating the brake device 32 is prevented from increasing excessively.

It should be noted that the present invention is not limited to the aforementioned embodiment and various modifications can be employed within the scope of the present invention.

For example, the first embodiment apparatus may be configured to stop the automatic activation of the brake device 32 when the predetermined time elapses after determining that the person H exists outside of the braking area Abrk after the automatic activation of the brake device 32 is started.

Further, the first embodiment apparatus is configured to select or acquire the motion vectors VTm regarding the moving object by using the two landscape images Limg11 and Limg12 acquired at the times t11 and t12, respectively after the non-detection situation occurs. In this regard, the first embodiment apparatus may be configured to select or acquire the motion vectors regarding the moving object by using the single landscape image acquired after the non-detection situation occurs and the single landscape image acquired before the non-detection situation occurs.

Further, the first embodiment apparatus is configured to determine whether or not the person H exists outside of the braking area Abrk on the basis of the positions of the end points Em of all of the motion vectors VTm as the moving object.

In this regard, the first embodiment apparatus may be configured to determine whether or not the person H exists outside of the braking area Abrk on the basis of the position of the end point of the single motion vector among all of the motion vectors VTm as the moving object. In this case, the first embodiment apparatus determines that the person H exists outside of the braking area Abrk when the end point of the single motion vector among the motion vectors VTm exists outside of the braking range Rimg.

Alternatively, the first embodiment apparatus may be configured to determine whether or not the person H exists outside of the braking area Abrk on the basis of the position of the end point of a representative motion vector representing the moving direction and the moving amount of the moving object acquired on the basis of all of the motion vectors VTm as the moving object. In this case, the first embodiment apparatus determines that the person H exists outside of the braking area Abrk when the end point of the representative motion vector exists outside of the braking range Rimg.

Further, the second embodiment apparatus may be configured to set the predetermined time Treq as the threshold time T2th.

Further, the second embodiment apparatus is configured to acquire the motion vector VTp of the single particular characteristic point Fp on the basis of the landscape image Limg21 acquired at the time t21 immediately before the non-detection situation occurs and the landscape image Limg22 acquired at the time t22 immediately before the time t21. In this regard, the second embodiment apparatus may be configured to acquire the motion vector VTp of the single particular characteristic point Fp on the basis of at least two landscape images Limg acquired at different times before the non-detection situation occurs.

Alternatively, the second embodiment apparatus may be configured to acquire the motion vector VTp of the single particular characteristic point Fp on the basis of the single landscape image Limg acquired at a time before the non-detection situation occurs and the single landscape image Limg acquired at a time after the non-detection situation occurs.

In addition, the second embodiment apparatus is configured to determine whether or not the person H exists outside of the braking area Abrk on the basis of the motion vector VTp of the single particular characteristic point Fp. In this regard, the second embodiment apparatus may be configured to determine whether or not the person H exists outside of the braking area Abrk on the basis of the motion vectors of the particular characteristic points. In this case, the second embodiment apparatus acquires the predetermined time Treq by using the moving direction and the moving speed of the person H acquired from the motion vectors of the particular characteristic points, respectively.

Further, the second embodiment apparatus may be configured to determine whether or not the person H exists outside of the braking area Abrk on the basis of a representative motion vector representing the moving direction and the moving speed of the person H acquired on the basis of the motion vectors of the characteristic points. In this case, the second embodiment apparatus acquires the predetermined time Treq by using the moving direction and the moving speed of the person H acquired from the representative moving vector.

Figure 13:
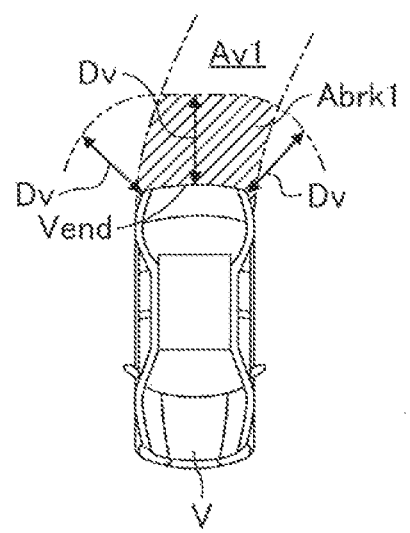
FIG. 13 is a view for showing the braking area different from the braking area shown in FIG. 4.

Further, as shown in FIG. 13, the braking area Abrk may be an area Abrk1 defined by an overlap of a traveling scheduled area Av1 and an area within a range of the predetermined distance Dv from the rear end Vend of the vehicle V. The traveling scheduled area Av1 varies, depending on an operation amount of a steering wheel of the vehicle V and a direction of the operation of the steering wheel.

Further, the first and second embodiment apparatuses may not include the engine ECU 20.

The camera device 11 may be a device for acquiring images of the landscape in front of the vehicle V. In this case, the braking area Abrk is an area defined by an overlap of a traveling scheduled area which the vehicle V is expected to travel when the vehicle V travels forward and an area within a range of a predetermined distance from the front end of the vehicle V. Further, at the steps 705 of FIGS. 7 and 11, it is determined whether or not the shift lever 25a is set at the forward traveling range, i.e., the D or B-range.

Further, the first and second embodiment apparatuses can be applied to a hybrid vehicle.

What is claimed is:

1. A vehicle brake control apparatus applied to a vehicle including:
    a brake device for braking the vehicle; and
    a camera device for capturing an image of a landscape in a traveling direction of the vehicle as a landscape image,
    the vehicle brake control apparatus comprising an electronic control unit configured to:
        perform a process for detecting a person image included in the landscape image by a pattern matching technique, the person image being an image of a person;
        determine whether or not a person exists in a braking area on the basis of a position of the person image in the landscape image when the electronic control unit detects the person image included in the landscape image, the braking area being a part of a traveling scheduled area of the vehicle that is within a range of a predetermined distance from the vehicle;
        start an activation of the brake device to brake the vehicle when the electronic control unit determines that the person exists in the braking area;
        determine whether or not the person exists outside of the braking area on the basis of the position of the person image in the landscape image after the electronic control unit starts the activation of the brake device;
        stop the activation of the brake device when the electronic control unit determines that the person exists outside of the braking area;
        determine whether or not a non-detection situation occurs after the electronic control unit starts the activation of the brake device, the non-detection situation being a situation that the electronic control unit cannot detect the person image by the pattern matching technique;
        acquire at least one first characteristic point included in a first landscape image and at least one second characteristic point included in a second landscape image when the non-detection situation occurs before the electronic control unit determines that the person exists outside of the braking area, the first landscape image being the landscape image acquired at a first time, the second landscape image being the landscape image acquired at a second time before the first time, the at least one second characteristic point corresponding to the at least one first characteristic point;
        acquire a moving direction and a moving amount of the at least one first or second characteristic point on the basis of the at least one first characteristic point and the at least one second characteristic point; and
        stop the activation of the brake device when the electronic control unit determines that the person exists outside of the braking area on the basis of the moving direction and the moving amount.

2. The vehicle brake control apparatus according to claim 1, wherein
    the first landscape image is the landscape acquired after the non-detection situation occurs,
    the at least one first characteristic point comprises a plurality of the first characteristic points,
    the at least one second characteristic point comprises a plurality of the second characteristic points corresponding to the first characteristic points, respectively, and the electronic control unit is configured to:
acquire primary motion vectors which are motion vectors each representing the moving direction and the moving amount of the corresponding first characteristic point on the basis of the first characteristic points and the second characteristic points;
select secondary motion vectors which are first motion vectors regarding a moving object from the primary motion vectors on the basis of a similarity between the first motion vectors; and
determine whether or not the person exists outside of the braking area on the basis of at least one of the secondary motion vectors.

3. The vehicle brake control apparatus according to claim 2, wherein the first and second landscape images are the landscape images acquired after the non-detection situation occurs, respectively.

4. The vehicle brake control apparatus according to claim 1, wherein
the second landscape image is the landscape image acquired before the non-detection situation occurs, and
the electronic control unit is configured to:
acquire a predetermined time on the basis of the moving direction, the moving amount and a position of the person image in the second landscape image, the predetermined time being a time estimated to be required for the person to move out from the braking area after the non-detection situation occurs; and
determine that the person exists outside of the braking area when a time elapsing from an occurrence of the non-detection situation becomes equal to or larger than a threshold time which is equal to or larger than the predetermined time, the threshold time increasing as the predetermined time increases.

5. The vehicle brake control apparatus according to claim 1, wherein
the first and second landscape images are the landscape images acquired before the non-detection situation occurs, respectively, and
the electronic control unit is configured to:
acquire a predetermined time on the basis of the moving direction, the moving amount and a position of the person image in the first landscape image, the predetermined time being a time estimated to be required for the person to move out from the braking area after the non-detection situation occurs; and
determine that the person exists outside of the braking area when a time elapsing from an occurrence of the non-detection situation becomes equal to or larger than a threshold time which is equal to or larger than the predetermined time, the threshold time increasing as the predetermined time increases.

* * * * *